March 12, 1957 R. G. WICKERSHAM ET AL 2,785,267

HEATER FOR TESTING ELECTRONIC CONDENSERS

Filed Feb. 6, 1956

INVENTOR.

ROY G. WICKERSHAM,
SIDNEY J. HOPPS,

BY James N. Lyles

ATTORNEY

United States Patent Office 2,785,267
Patented Mar. 12, 1957

2,785,267

HEATER FOR TESTING ELECTRONIC CONDENSERS

Roy G. Wickersham and Sidney J. Hopps, Hollywood, Fla.

Application February 6, 1956, Serial No. 563,732
1 Claim. (Cl. 219—21)

Figures 1, 2, 3:
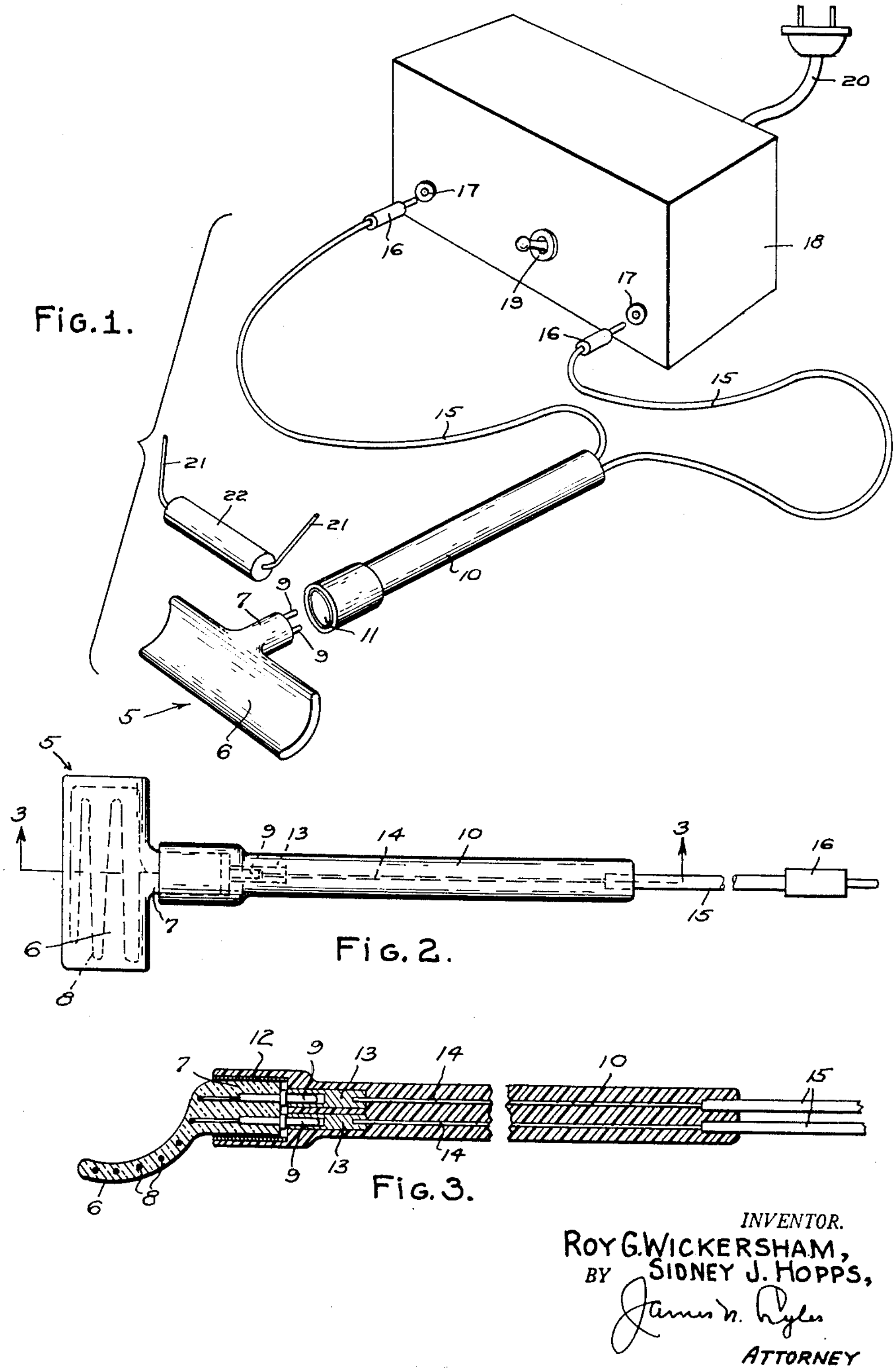

This invention relates to a testing device for conditioning a capacitor condenser to determine its behavior when subjected to heat.

The invention relates primarily to a heater device whereby to heat the condenser as a means to test it as to breakdown similar to actual use of the condenser in an electronic circuit.

Electronic assemblies are usually housed in cabinets or cases which allow very little heat dissipation, which is one factor in causing a temperature rise in all component parts. A defective capacitor condenser will be effected by this temperature rise to the extent that the circuit fails to function properly. In most cases this malfunction will show up either visually or orally depending on the type of equipment. When the assembly is removed from its housing and inverted to enable the engineer to locate the ailing condenser, some method must be used to project heat to the components so that the same heat conditions, as existed when it was in its housing, are approximated. The only method used heretofore to project this heat to the equipment has been the highly awkward and unsuccessful use of heat lamps. It is also a well known fact that most condensers will function normally when cold, but may break down and often do, when subjected to normal heat influences in the equipment. Such use of heat lamps subjects all the parts in the area to its heat and consequently does not direct its effect to any one part. In electronic devices, such as the well known television receivers, where trouble is evident in a condenser, it is extremely difficult to determine which condenser is at fault and usually requires that the mechanic remove the condensers progressively for replacement with one that is known to be good so as to determine which condenser is actually at fault. Such procedure is tedious and time-consuming and obviously results in an unnecessarily high cost for repairs. With the device of the present invention, the condensers may be easily brought to a normal operating temperature without the removal or unsoldering of the terminal wires and after such heating, the results can be seen or heard, depending on the equipment such, for instance, in the case of television receivers.

It is an object of the present invention to provide a heater element in the form of a semi-circular cradle that will partially embrace the well known cylindrical condenser either in an underlying or overlying engagement and with the cradle embodying a heating element that is energized from a low voltage stepdown transformer whereby to initially heat the condenser to a normal operating temperature or higher.

Novel features of construction and operation of the device will be more clearly apparent during the course of the following description, reference being had to the accompanying drawings, wherein has been illustrated a preferred example thereof.

In the drawings:

Figure 1 is a composite perspective view of a heater device constructed in accordance with the invention, showing the same in disassembled form and in association with a conventional transformer, Figure 2 is a plan view of the device in assembled relation and, Figure 3 is a longitudinal section taken substantially on line 3—3 of Figure 2.

Referring specifically to the drawings, the numeral 5 designates a heater head as a whole. The head 5 is in the form of a semi-cylindrical cradle 6. The cradle 6 intermediate its length is provided with an integral lateral shank 7, preferably of cylindrical form. The cradle 6 and the shank 7 are preferably molded from a suitable ceramic material. Embedded within the cradle 6 for its major length is a heating coil 8, the terminal ends of which are connected to prongs 9 that are molded in the shank 7 and constitute the electrodes through the medium of which the coil is energized. The angularity of the cradle 6 with respect to the shank 7 is shown more clearly in Figure 3. The numeral 10 designates a handle portion through the medium of which the cradle is supported and with the handle constituting a female plug section for the shank 7 and the prongs 9. The handle 10 is preferably formed of a suitable plastic material calculated to retard the conductivity of heat from the head 5, thus facilitating the use of the device manually without discomfort to the hand of the operator. The handle 10 at its forward end is provided with a cylindrical socket 11 that is circumferentially lined with a band of cork or other suitable heat insulating material 12. Suitably spaced in the base of the socket 11, is a pair of metallic connectors 13 that have mating engagement with the prongs 9. Electrical leads 14 are likewise molded into the handle 10 for connection to the connectors 13 and terminate at the rear end of the handle in a pair of flexible elongated electrical conductors 15. The conductors 15 are provided with terminal plugs 16. The plugs 16 are adapted to plug into suitable sockets 17 carried by a conventional step-down transformer 18 and whereby the transmission of electrical energy to the plug 16 will be of relatively low voltage of approximately six volts. The transformers may embody a control switch 19 and obviously will be provided with an electrical connector 20 for energizing the transformer from a source of electrical energy.

The device is primarily adapted to test or condition a condenser, such as that illustrated in Figure 1 and commonly recognized as a capacitor type, having wire leads 21 and a cartridge casing 22. Normally these condensers are disposed at various points throughout the electronic device and it is difficult and time consuming to individually remove the condensers in order that a test may be made thereon. Condensers of this type may be defective, but will ordinarily operate when they are cold. However, after the television or other electronic device has been placed in operation, the condensers are heated, due to their close association or proximity to heat producing components and should one or more condensers be defective, it or they are likely to break down in the presence of heat. It has heretofore been necessary to individually examine each condenser to determine which one is at fault and it has been necessary that the condensers be unsoldered from the set in order to determine its functional ability. With a knowledge that there is a defective condenser within the television, the operator proceeds to progressively make his tests with the electronic device in operation. This is accomplished by plugging the terminals 16 into the transformer and plugging the head 5 into the end of the handle 10. After the head 5 has been heated for a predetermined length of time, the cradle is applied either in underlying relation to a suspected condenser or in overlying relation thereto, depending largely on how the handle will be supported with respect to the surrounding mechanism. When in an underlying relation to the condenser 22, the handle may act as a fulcrum to hold the cradle 6 in contact with the body of the condenser or, when the cradle 6 is in overlying relation to the condenser the handle 10 may merely rest upon any adjacent surface of the mechanism. When the condenser has been thus heated sufficiently and it is defective, the resulting change may be definitely observed (for example) on the screen of a television set. The condensers can thus be quickly and easily tested without the necessity of their removal from the television receiver.

It will be apparent from the foregoing that an extremely simple and most effective means has been provided to quickly and easily test the well known capacitor condenser. The device is cheap to manufacture, is strong, durable and is a most valuable aid for the average electronic engineer or repairman.

It is to be understood that the invention is not limited to the precise arrangement shown, but that changes are contemplated as readily fall within the spirit of the invention as shall be determined by the scope of the subjoined claim.

Having described our invention, what we claim as new and desire to secure by Letters Patent is:

A heating device for capacitor condensers of the type embodied in electronic circuits, comprising a molded ceramic head portion that is contoured to form an elongated cradle, the head portion being provided intermediate its ends with a lateral and integral cylindrical shank, metallic prongs embedded in the shank in spaced apart relation and with the prongs extending outwardly from the end of the shank, a heating wire coil embedded in the head for its major area and with the ends of the coil being connected to the prongs, a cylindrical plastic handle for the support of the head portion, the handle being provided at one end with a cylindrical socket whereby to receive the shank, electrical conductors extending through the handle, sockets connected with the conductors at their inner ends and with the sockets opening into the base of the cylindrical socket, the said shank and its prongs being axially engageable into the said shank and its prongs being axially engageable into the cylindrical socket for electrical connection with the sockets of the conductors, the conductors at their opposite ends being extended beyond the handle and with their terminal ends being provided with plugs whereby to have electrical connection with a source of electrical energy, the said cylindrical socket of the handle being circumferentially lined with a heat insulating sleeve whereby to retard the transmission of heat from the head portion of the handle.

References Cited in the file of this patent

UNITED STATES PATENTS

| | | |
|---|---|---|
| 1,974,051 | Kelly | Sept. 18, 1934 |
| 2,114,703 | Conner | Apr. 19, 1938 |
| 2,544,326 | Jones | Mar. 6, 1951 |
| 2,705,277 | Cielesz | Mar. 29, 1955 |